(12) United States Patent
Truman

(10) Patent No.: X6778
(45) Date of Patent: Sep. 29, 1831

(54) TIN PLATE, COATING WITH LEAD

(76) Inventor: Joseph M. Truman

United States Patent

Patent No.: X6778

Joseph M. Truman, of Philadelphia Penn.

Letters Patent.

The schedule referred to in these Letters Patent, and making part of the same containing a description in the words of the said Joseph M. Truman himself of his improvement in the mode of rendering tin plate more durable by coating the same with lead, ...

To all whom it may concern Be it known that I Joseph M. Truman of the City of Philadelphia, have invented a method of rendering tin plate more applicable to various uses than in the ordinary manner of employing it with a simple coating of tin upon the iron and that the following is a full and exact description of my said invention.

The purpose which I have in view is to preserve the iron more effectually from rust, and consequently to render the plates much more durable than heretofore when employed for the covering of roofs, the making of pipes, gutters, cisterns, bathing tubs and [illegible] other articles. In order to attain this end, I cover the tin plates with a coating of lead, by immersing them in a bath of that metal in a state of fusion, For most purposes I dip the plates singly into the lead after having dusted them with powdered rosin or any other suitable flux after which, I unite them together in the usual way.

When required for gutters I generally groove the sheets together so as to form strips of convenient length; these strips are then passed thro' the melted lead immediately from the bath, I cause the strips to pass between one or more pair of rollers, which rollers may be made of wood or of metal, covered with [illegible] [illegible] or cotton cloth, or other yielding substance, these rollers I keep greased with oil or tallow I have thus described the mode in which I usually effect the proposed object but I do not claim the particular implements or method employed, as making any part of my invention; What I do claim, and for which I ask a Patent, is the covering of tin plate with a coating of lead and applying the plates so coated to the purposes herein set forth.

Witnesses Alw Geyer [illegible]

Joseph M. Truman